United States Patent [19]
Wilkerson

[11] 3,854,171
[45] Dec. 17, 1974

[54] STEERING WHEEL HOLDER
[76] Inventor: Edward D. Wilkerson, P.O. Box 755 S. Court, Morristown, N.J. 08739
[22] Filed: Aug. 29, 1973
[21] Appl. No.: 392,653

[52] U.S. Cl. .................................. 24/81 A, 74/495
[51] Int. Cl. ........................ A44b 21/00, B62d 1/16
[58] Field of Search ............ 24/81 A, 81 R, 263 LS, 24/263 PJ, 263 A; 74/495

[56] References Cited
UNITED STATES PATENTS
| 1,409,233 | 3/1922 | Pataky | 24/81 AE UX |
| 1,452,240 | 4/1923 | Hamon | 74/495 |
| 3,066,368 | 12/1962 | Czapar | 24/81 R |
| 3,257,862 | 6/1966 | Ambrose | 74/495 |
| 3,602,961 | 9/1971 | Shibata et al. | 24/263 PJ X |

Primary Examiner—Donald A. Griffin

[57] ABSTRACT

A steering wheel holder having a steering wheel clamp and a vehicle body clamp connected together by an elongated body or tie bar. The elongated body carries a ball and socket joint, or alternatively an angle link, to which the vehicle clamp is coupled. The vehicle clamp includes a pair of slidably adjustable jaws which have a full circle of rotation relative the elongated body as well as pivotal movements in other planes. The jaws are adapted for clamping connection, for example, to a vehicle door, window or window post.

4 Claims, 5 Drawing Figures

PATENTED DEC 17 1974　　　　　　　　　　　　　　　3,854,171

3,854,171

STEERING WHEEL HOLDER

DETAILED DESCRIPTION OF THE PRIOR ART

The prior art discloses a limited number of steering wheel holders. One of these devices is shown in U.S. Pat. No. 3,066,368. This device employs an elongated tie bar which carries two spring clip clamps. One clamp attaches to a vehicle steering wheel and the other to the vehicle body. Limited relative movement is provided between the two clamps. Accordingly, proper positioning of the holder clamps to maintain the steering wheel in a desired position can be troublesome.

Other steering wheel holders are shown in U.S. Pat. Nos. 1,452,240; 3,138,036 and 3,257,862.

SUMMARY OF THE INVENTION

During wheel alignment or balancing operations, a steering wheel holder must hold the steering wheel firmly to prevent even slight movements. To attain this objective, either the top or bottom of the steering wheel must be rigidly attached to the vehicle door, window or window post. Due to the many and varied dispositions of these attaching support elements, prior art steering wheel holders could not attain the desired universal application to all vehicle models. Considerable trial and error by an operator was often required to locate proper vehicle support elements.

Notwithstanding the seeming incongruity of requirements, the steering wheel holder of this invention anchors the steering wheel rigidly with a holder design that enables substantial universal movement to the vehicle clamp. The vehicle clamp is provided with pivoting movement in at least two perpendicular planes. Additionally, the vehicle clamp is capable of a full circle of attitude positions.

The foregoing objectives are attained by employing a vehicle clamp, employing adjustable opening and closing jaws, which is pivotally supported on an elongated body by a ball and socket joint or an angle link.

DETAILED DESCRIPTION OF THE DRAWINGS

In order that all of the structural features for attaining the objects of this invention may be readily understood, reference is herein made to the accompanying drawings, wherein.

DETAILED DESCRIPTION OF THE PREFERRED EMBODIMENTS

Figures 1, 4:
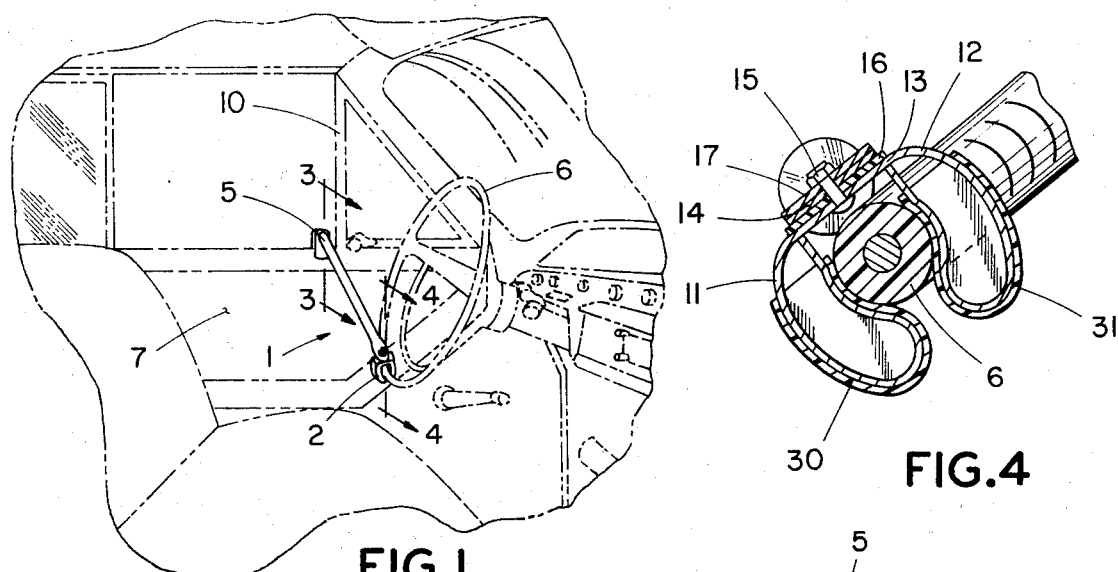
FIG. 1 is a perspective view of the steering wheel holder of this invention anchoring a steering wheel to a front door window.
FIG. 4 is a section view taken along line 4—4 of FIG. 1 showing the other end portion of the steering wheel holder clamped to the steering wheel.
Figure 2:
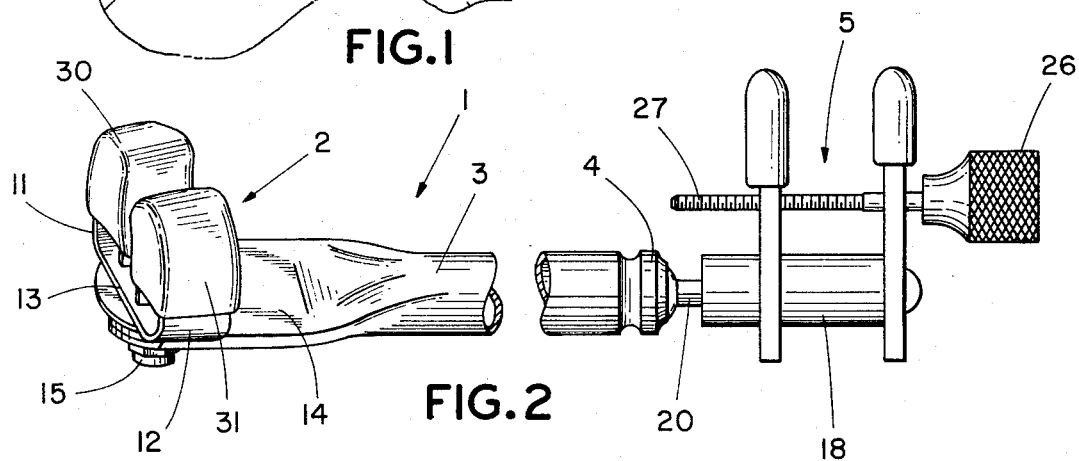
FIG. 2 is an elevation view of the steering wheel holder of FIG. 1 removed from the steering wheel and incorporating a ball joint.
Figures 3, 5:
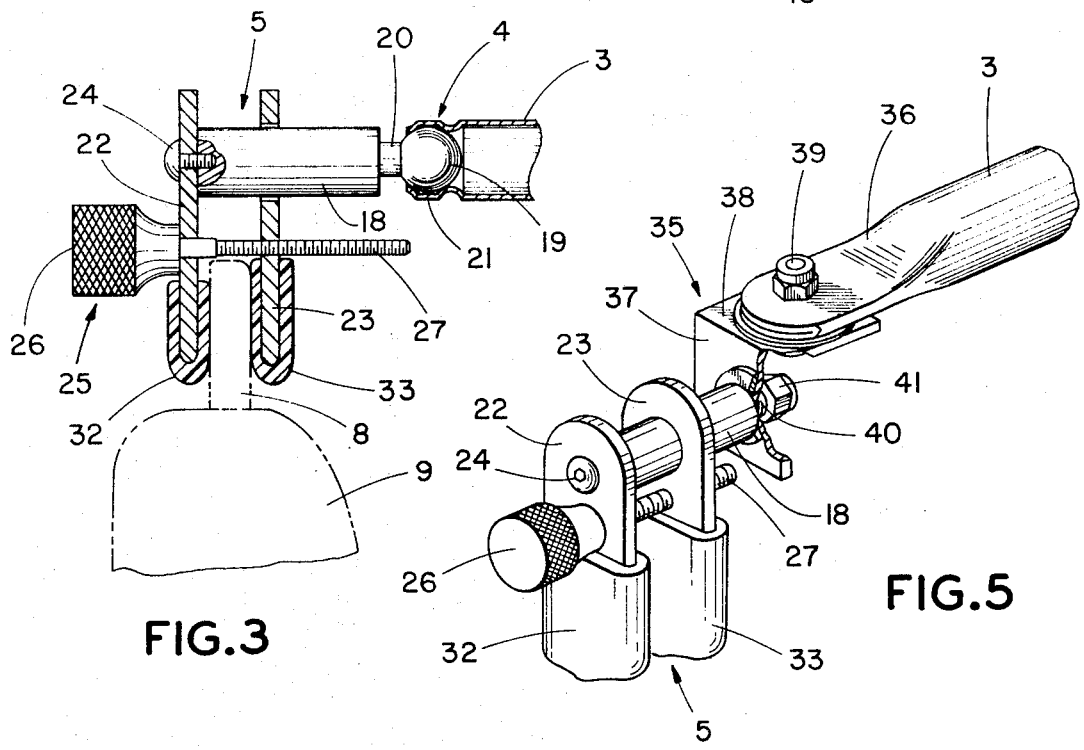
FIG. 3 is a section view taken along line 3—3 of FIG. 1 showing an end portion of the steering wheel holder optionally clamped to a door window.
FIG. 5 is a perspective view of a second embodiment of a steering wheel holder which substitutes an angle link for the ball joint.

Referring now to FIGS. 1 through 4 of the drawings, the improved steering wheel holder 1 of this invention comprises as its principal components a steering wheel clamp 2, an elongated clamp support body 3 (or tie bar) in tubular form, a universal coupling which is in the first preferred embodiment a ball and socket joint 4, and a vehicle clamp 5. The principal function of steering wheel holder 1 is to anchor steering wheel 6 (FIG. 1) in the desired operational position relative vehicle 7 to enable a wheel alignment or balancing operator to perform the required measurement and correcting procedures. Accordingly, steering wheel clamp 2 (FIGS. 1, 2 and 4) engages steering wheel 6, and vehicle clamp 5 optionally engages door window 8 (FIGS. 1, 2 and 3).

As will be outlined hereafter in detail, vehicle clamp 5 is adjustable so that it may alternatively engage door 9 (FIG. 3) or window post 10 (FIG. 1) depending upon optimum clamping for a particular holding operation.

Referring to FIGS. 2 and 4, steering wheel clamp 2 is a spring clip formed with a pair of resilient clip type jaws 11 and 12 integrally joined together by a base section 13. The adjacent supporting end 14 of elongated body 3 is flattened so that the clip base section 13 is pivotally attached to end 14 by nut and bolt 15 which couples together base section 13, washer 16, end 14 and washer 17 (FIG. 4). Clip jaws 11 and 12 of steering wheel clamp 2 are resiliently supported on clip base section 13. Accordingly, clamp 2 may be manually pressed to engage steering wheel 6 by passing the steering wheel between the opening formed at the extremities of jaws 11 and 12.

In view of the fact that the clamp 2 is rotatably pivoted relative rod 3 by nut and bolt 15, the jaws of clamp 2 may be moved relative the rod so that the steering wheel may be engaged at the top or bottom, as may be desired for a particular operation.

Vehicle clamp 5 is shown in FIGS. 1, 2 and 3. This clamp comprises as its principal components a vehicle clamp shaft 18. Clamp shaft 18 is coupled to elongated body 3 by means of ball and socket 4. As is shown in detail in FIG. 3, ball 19 is rigidly fixed to shaft 18 by ball support post 20. The end portion of rod 3 enveloping ball 19 is crimped and formed so as to provide a mating socket 21 for ball 19. Accordingly, clamp 5 is rotatable relative shaft 3 in a plurality of orbits defined by ball and socket 19, 21.

Shaft 18 of vehicle clamp 5 supports a fixed jaw 22 and a movable jaw 23, as is shown in FIGS. 2 and 3. Screw 24 rigidly attaches fixed jaw 22 to the adjacent end of shaft 18, and inasmuch as jaw 23 is formed with a hole somewhat larger than the outer diameter of shaft 18, jaw 23 is capable of sliding movement relative the longitudinal axis of shaft 18.

The projecting extremities of jaws 22 and 23 are formed with holes which receive adjusting screw 25. Adjusting screw 25 includes a manual operating knob 26 which rotates a threaded shaft portion 27 projecting from knob 26. Only jaw 23 is formed with threads which mate with the threads of adjusting screw shaft 27. Accordingly, manual rotation of knob 26 causes axial sliding movement of jaw 23 relative shaft 18 to open or close the jaw pair 22, 23 relative one another as is required.

In view of the fact that vehicle clamp 5 is coupled to elongated body 3 by universal joint 4, vehicle clamp 5 and its jaws 22, 23 may be rotated in attitude through a full circle relative the fixed tubular body 3, and additionally in view of the ball and socket coupling, the clamp may also be moved in a plurality of orbits relative the longitudinal axis of elongated body 3. The limit of these orbits is defined by contact between ball support post 20 and the adjacent lip of ball socket 21.

For alignment or balancing purposes, a wheel holder of the type described in the specification must hold the steering wheel firmly to prevent even slight rotation. To achieve this, either the top or bottom of the wheel must be rigidly attached to the door, door window glass, or the window post. Owing to the variation of the vertical plane of the doors in the various models of vehicles, as well as the presence and absence in different models of a vehicle window post, a clamping device used to attach to the vehicle must advantageously contain either (1) a ball joint or (2) an angle link as is described in the second embodiment of this invention. Such a coupling of the vehicle clamp to the elongated body or tie bar 3 should preferably be firm jaw type, and not of a spring clip construction, as is shown herein for use as a steering wheel clamp. In view of the fact that the vehicle clamp jaws may be rotated throughout a full circle of attitudes and additionally the clamp may be moved throughout a plurality of orbits, it is possible to obtain such a secure clamping in a vehicle by selecting advantageously either a door, such as 9, or a window, such as 8, or alternatively a window post, such as 10.

The steering wheel holder construction of this invention advantageously incorporates a ball and socket joint 4 with a vehicle clamp 5 of the type of construction shown so that a rigid attachment to the vehicle element can be attained irrespective of the physical disposition of that element relative the steering wheel. Thus, the steering wheel holder has universal application to vehicles of all makes and models and is not limited to particular vehicles as is the case with certain prior art devices which could not accommodate for the varied relative positions of the door, window or window post elements of a vehicle.

In order to prevent scratching of the steering wheel and also the vehicle body components, jaws 11 and 12 of steering wheel clamp 2 and jaws 22 and 23 of vehicle clamp 5 are protectively covered with plastic layers 30, 31, 32 and 33, respectively.

A second embodiment of the steering wheel holder of this invention is shown in FIG. 5. In this embodiment ball and socket 4 is eliminated and angle link 35 is coupled to an adjacent flattened end 36 of body 3. Angle link 35 is formed with a pair of legs 37 and 38, each of which is apertured. In particular, leg 38 is pivotally coupled to body end 36 by nut and bolt 39, and leg 37 is coupled to vehicle clamp shaft 18 by means of a threaded post section 40 which carries nut 41. Jaws 22 and 23 and adjusting screw 25 of vehicle clamp 5 are otherwise identical to the construction previously described with respect to FIGS. 1 through 4.

In view of the fact that leg 37 is formed with an enlarged aperture, vehicle clamp 5 is capable of rotating through a full circle of attitudes with respect to leg 37. Similarly, in view of the fact that leg 38 is formed with an enlarged aperture, vehicle clamp 5 is capable of rotating through a full circle of rotation relative end 36.

This combination of relative rotational movements enables vehicle clamp 5 to attain a required disposition relative a vehicle element which is to be engaged by the clamp.

The above described embodiments are illustrative of the principles of this invention. It is obvious that changes and variations can be made without departing from the scope of the invention.

What is claimed is:

1. In a removable steering wheel holder for anchoring a vehicle steering wheel in a desired position relative the vehicle and which holder has an elongated body supporting a steering wheel clamp and a vehicle clamp, the improvement comprising a universal coupling connected to the elongated body to support the vehicle clamp with the vehicle clamp being pivotable relative the elongated body in both of two perpendicular planes with a full circle of vehicle clamp attitudes, and in which the universal coupling includes an angle link and a vehicle clamp shaft with the angle link having two legs one of which is pivotable in a first plane relative the elongated body and the other leg supports the vehicle clamp shaft so the clamp is rotatable in a full circle of rotation relative the second leg in a plane perpendicular to the first plane.

2. The combination of claim 1 in which the vehicle clamp includes a vehicle clamp shaft, a first jaw fixed to the shaft and a second jaw slidably supported on the shaft, and an adjusting screw coupling the two jaws to one another with rotation of the screw moving the two jaws relative one another for rigid attachment to a vehicle.

3. In a removable steering wheel holder for anchoring a vehicle steering wheel in a desired position relative the vehicle and which holder has an elongated body supporting a steering wheel clamp and a vehicle clamp, the improvement comprising a ball and socket universal coupling connected to the elongated body to support the vehicle clamp with the vehicle clamp being pivotable relative the elongated body in both of two perpendicular planes with a full circle of vehicle clamp attitudes, and in which the vehicle clamp includes a vehicle clamp shaft, a first jaw fixed to the shaft and a second jaw slidably supported on the shaft, and an adjusting screw coupling the two jaws to one another with rotation of the screw moving the two jaws relative one another for rigid attachment to a vehicle.

4. In a removable steering wheel holder for anchoring a vehicle steering wheel in a desired position relative the vehicle and which holder has two elongated shafts with one shaft pivotally supporting a steering wheel clamp and the other shaft supporting a vehicle clamp, the improvement comprising a universal coupling interconnecting the two elongated shafts so that each shaft is rotatable in varying conical orbits relative the longitudinal axis of the other shaft, and means coupling the vehicle clamp to the vehicle clamp support shaft so as to be non-rotatable relative an axis radial to the longitudinal axis of the vehicle clamp support shaft.

* * * * *